United States Patent Office 3,704,129

Patented Nov. 28, 1972

3,704,129

TWO COMPONENT DIAZOTYPE COMPOSITION HAVING ADDITIONALLY AN ANILINE COMPOUND

Henri G. J. de Boer and Thomas Brooshooft, Delft, and Anton Wemmers, den Hoorn, Holland, assignors to GAF Corporation, New York, N.Y.

No Drawing. Filed Feb. 6, 1970, Ser. No. 9,428
Int. Cl. G03c *1/58, 1/60*
U.S. Cl. 96—91 R 9 Claims

ABSTRACT OF THE DISCLOSURE

A light-sensitive diazotype material comprising a light-sensitive diazonium salt, an organic coupling component and an aromatic amine of the general formula

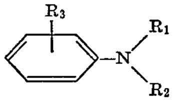

where $R_1$ and $R_2$, which are the same or different, can be hydrogen, alkyl, hydroxyalkyl, aryl, substituted aryl, aralkyl or substituted aralkyl but $R_1$ and $R_2$ cannot both be hydrogen and $R_3$ can be halogen or the same as $R_1$ and $R_2$.

This invention relates to diazotype processes and materials therefor in which a light-sensitive diazo component is reacted with an azo coupling component to form a photographic image.

The present invention is concerned with diazotype materials where the image is developed by exposure to an alkaline compound.

The diazo compositions most widely employed in the alkali development process comprise a light-decomposable diazonium salt, an organic coupling component and stabilizing compounds. A material coated with this type of composition is exposed to light through a negative or positive and the diazonium salt is decomposed in those areas exposed to the light. The unexposed areas remain undecomposed and are subject to further reaction in the presence of an alkaline reagent to produce a coloured image with the coupler. The colour-producing reaction is produced by an alkaline compound, generally gaseous ammonia.

An important property of any diazotype reproduction material is its stability prior to the point of time when it is to be used. Materials which display poor stability have a shelf-life which is not as long as desired. This means that if the material is stored for a length of time, which may easily be encountered in commercial operations, the quality of the diazo prints eventually obtained is deficient.

This lack of stability may be due to a variety of reasons. One reaction that may take place is pre-coupling between the light sensitive diazo compound and the coupling component. Another reaction that can occur, particularly in the presence of auxiliary substances such as zinc chloride or thiourea, is the formation of precipitates in the sensitizing solution.

An object of the present invention is to provide a light-sensitive diazotype material having an improved shelf-life.

A further object of the invention is to provide sensitizing solutions which do not tend to produce precipitation.

According to the present invention there is provided a light-sensitive diazotype reproduction material which comprises a light-decomposable diazonium salt, an organic coupling component and an aromatic amine of formula

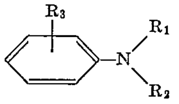

wherein $R_1$ and $R_2$ are the same or different and are hydrogen or alkyl, hydroxyalkyl, aryl or aralkyl groups, or are aryl or aralkyl groups substituted by hydroxy or amino groups or by halogen, with the proviso that $R_1$ and $R_2$ may not be hydrogen at the same time, and $R_3$ may be the same as $R_1$ or $R_2$ or may be halogen.

The N-alkyl and the N,N-dialkyl compounds are particularly preferred.

The salts of such aromatic amines may also be used.

The use of the aromatic amines defined above causes a stabilizing effect on the light-sensitive materials and prevents precipitation of component compounds from the sensitizing solution.

Preferred proportions of the ingredients in the light-sensitive compositions are 2–10 moles of the light-sensitive diazonium compound, 3–12 moles of the organic coupling component and 2–24 moles of the organic amine. When the composition is coated onto a substrate preferred dry coating weights are 0.5 to 4.5 grams per square metre.

Typical light-sensitive diazonium compounds which may be used in the composition of the invention are p-diazo-ethyl-hydroxyethylaniline zinc chloride double salt
p-diazo-diethylaminobenzene zinc chloride
p-diazo-dimethylaniline zinc chloride
p-diazo-N-ethyl-O-toluidine zinc chloride
p-diazo-diethylaniline zinc chloride
p-diazo-1-morpholinobenzene zinc chloride double salt
p-diazo-2,5-diethoxy-benzylaniline zinc chloride double salt
p-diazo-2,5-dibutoxy-1-morpholinobenzene zinc chloride double salt
p-diazo-ethyl-benzylaniline zinc chloride double salt
p-diazo-2,5-diethoxy-1-morpholinobenzene zinc chloride double salt Any combination of the above diazonium salts may be employed within the scope of this invention.

Of these materials p-diazo-4-diethylaminobenzene zinc chloride and p-diazo-2,5-diethoxy-4-morpholino benzene zinc chloride are particularly preferred.

The diazo coupler or coupling component may be any material known in the art for use as a coupler with the light-sensitive diazonium compounds. Thus β-naphthol and its derivatives are suitable for this purpose and specific mention may be made of 2,3- or 2,7-dihydroxy-naphthalene; 2-hydroxy-naphthalene-3,6-disulphonic acid; 2,3-dihydroxy - naphthalene - 6 - sulphonic acid; 2,7-dihydroxynaphthalene-3,6-disulphonic acid; derivatives of 2-hydroxynaphthoic acid-3, for instance its anilides, hydroxyalkyl amides or aminoalkyl amides.

Particularly preferred coupling components are 2,3-dihydroxy-naphthalene, 2 - hydroxy-(N-ω-morpholino-propyl)-3-naphthamine and N,N'-bis acetoacet ethylene diamide.

Preferred aromatic amines used in the composition of the invention are 4-p-methylamino benzyl resorcinol, 4,6-bis(p-methylamino benzyl)-resorcinol and N-methylaniline. The latter is particularly preferred. Since these resorcinol derivatives possess coupler properties, their preferred use is in blackline materials.

Stabilizing acids are usually present to assist in preventing premature coupling of the light-sensitive diazonium salt and its coupler. A number of acids are known for this purpose such as citric acid, maleic acid, malonic acid, tartronic acid, boric acid, glyoxalic, sulphanilic acid or malic acid. It is to be understood that these are mentioned by way of illustration only.

The substrate is generally a standard commercial diazo process paper but any porous or pon-porous substrate is within the scope of the invention. Thus the substrate may be a plastic film such as cellulose acetate, butyrate or propionate or polyethylene terephthalate. It may be glass fibre or glass or even metal.

The coating composition may include one or more light-sensitive diazonium azo couplers and stabilizing acids.

Auxiliary substances such as zinc chloride, to assist in line intensification or thiourea may also be present. Dispersed solids such as polyvinyl alcohol resin may improve the evenness of the coating.

The alkaline material generally employed is cold or hot gaseous ammonia fumes. However, sodium carbonate or tri-sodium phosphate may be used or volatile basic organic nitrogen compounds.

The sensitizing liquid may be coated on the substrate which is then dried. In general, the application of the liquid to the substrate is effected by methods known in the fields.

The invention is illustrated by the following examples.

EXAMPLE I

A light-sensitive composition was formed comprising the following constituents.

Composition A

| | | |
|---|---|---|
| Water | ml | 70 |
| Citric acid | gm | 4 |
| Zinc chloride | gm | 4 |
| 2,3-dihydroxynaphthalene | gm | 0.4 |
| Dipropylene glycol | ml | 3 |
| N,N-diethylamino benzene diazonium chloride, stabilized with $ZnCl_2$ | gm | 0.9 |
| Thiourea | gm | 4 |

Composition A is an example of a known sensitizing solution and it was coated on to a pre-coated paper in an amount of 0.5 to 4.5 grams dry weight per square metre of surface.

Composition A was then varied by the addition of the following materials.

| | Gm. |
|---|---|
| (1) N-methyl aniline hydrochloride | 4 |
| (2) 4,6-bis (p-methylamino benzyl)-resorcinol hydrochloride acid salt | 1.4 |
| (3) 4-p-methylamino benzyl resorcinol, hydrochloride acid salt | 1.4 |
| (4) N,N-dimethyl aniline hydrochloride | 4 |
| And 4,6-bis (p-methylamino benzyl)-resorcinol hydrochloride acid salt | 1.4 |

All the compositions 1 to 4 were applied to a precoated paper in the same manner as with Composition A. It was found in various forced ageing tests that the shelf-life of papers coated with compositions 1 to 4 were considerably better, by a factor of 2 to 10 times, as compared to paper coated with Composition A.

EXAMPLE II

A light-sensitive composition was formed comprising the following constituents.

Composition B

| | | |
|---|---|---|
| Water | ml | 70 |
| Citric acid | gm | 4 |
| Zinc chloride | gm | 4 |
| Disodium salt of 2,7-dihydroxy-3,6-naphthalene disulphonic acid | gm | 0.8 |
| Dipropylene glycol | ml | 3 |
| N,N-diethylamino benzene diazonium chloride, stabilized with $ZnCl_2$ | gm | 0.9 |
| Thiourea | gm | 4 |

This is an example of a known sensitizing solution and it was coated on to a pre-coated paper in the same manner as with Composition A. Another sensitizing solution was also prepared which differed from Composition B by the addition of (5) N-methylaniline hydrochloride 4 gm.

This was likewise coated on to a pre-coated paper and the shelf-life of the two coated papers compared. The paper including the material of the invention had a 4 to 5 times longer shelf-life than that coated with Composition B.

EXAMPLE III

A light-sensitive composition was formed comprising the following constituents.

Composition C

| | | |
|---|---|---|
| Water | ml | 70 |
| Citric acid | gm | 4 |
| Zinc chloride | gm | 4 |
| N,N'-ethylene bisacetoacetamide | gm | 0.6 |
| Dipropylene glycol | ml | 3 |
| N,N-diethylamino benzene diazoniumchloride, stabilized with $ZnCl_2$ | gm | 0.9 |
| Thiourea | gm | 4 |

Composition C is an example of a known sensitizing solution and it was coated on a pre-coated paper in an amount of 0.5 to 4.5 gms. dry weight per square metre of surface.

Composition C was then varied by the addition of the following materials.

| | Gm |
|---|---|
| (6) N-methylaniline hydrochloride | 0.4 |
| (7) N-methylaniline hydrochloride | 4.0 |
| (8) N,N-dimethylaniline hydrochloride | 4.5 |

Compositions 6 to 8 were applied to a pre-coated paper in the same manner as with Composition C. It was found that the shelf-life of papers coated with Compositions 6 to 8 were considerably better, by a factor of 2 to 10 times, as compared with paper coated with Composition C.

EXAMPLE IV

A light-sensitive composition was formed comprising the following constituents.

Composition D

| | | |
|---|---|---|
| Water | ml | 70 |
| 5-sulfosaliocyclic acid | gm | 1.5 |
| N-ω-morpholinopropyl 2-hydroxy 3-naphthamide | gm | 1.2 |
| Thiourea | gm | 3 |
| Dipropylene glycol | gm | 5 |
| Zinc chloride | gm | 5 |
| 4 morpholino, 2,5 diethoxy benzene diazonium diazonium chloride stabilized with $ZnCl_2$ | gm | 0.7 |
| N-methyl aniline hydrochloride | gm | 2 |

This is an example of a light-sensitive sensitizing solution embodying the invention. A similar composition was also formed in which two grams of N,N-dimethylaniline hydrochloride was substituted for the N-methylaniline hydrochloride. Should the aniline derivatives according to the invention be omitted a non-homogeneous and therefore unusable sensitizing solution would have been obtained. Both compositions were applied to precoated papers in an amount of 0.5 to 4.5 grams dry weight per square metre of surfaces. The papers showed good shelf-life.

What we claim is:

1. A light-sensitive two component diazotype composition which comprises a light-decomposable diazonium salt, an acid stabilizer, an azo coupling component and, as a precipitation stabilizer for the two component composition, a hydrochloric acid salt of an aromatic amine of the formula

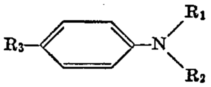

wherein $R_1$ is lower alkyl, $R_2$ is hydrogen or lower alkyl and $R_3$ is hydrogen, 2,4-dihydroxybenzyl, or 2,4-dihydroxy-5-(p-alkylaminobenzyly)-benzyl radical and wherein the azo coupling component has a formula other than that of the said hydrochloric acid salt of the aromatic amine.

2. A composition as claimed in claim 1 wherein the aromatic amine is 4-p-methylaminobenzyl resorcinol.

3. A composition as claimed in claim 1 wherein the aromatic amine is 4,6-bis(p-methylaminobenzyl)-resorcinol.

4. A composition as claimed in claim 1 wherein the aromatic amine is N-methylaniline.

5. A composition as claimed in claim 1 wherein the aromatic amine is N,N-dimethylaniline.

6. A composition as claimed in claim 1 wherein the diazonium salt is p-diazo-4-diethylaminobenzene zinc chloride.

7. A composition as claimed in claim 1 wherein the diazonium salt is p-diazo-2,5-diethoxy-4-morpholino benzene zinc chloride.

8. A diazotype reproduction material comprising a support having coated thereon a light-sensitive diazotype composition as defined in claim 1.

9. A diazotype reproduction material as claimed in claim 8 wherein the dry coating weight of the composition is 0.5 to 4.5 grams per square meter.

References Cited

UNITED STATES PATENTS

| | | | |
|---|---|---|---|
| 2,531,091 | 11/1950 | Van Dormael | 96—49 |
| 3,343,960 | 9/1967 | Sus | 96—91 R |
| 3,199,982 | 8/1965 | Kashiwaborg | 96—91 RX |
| 3,473,930 | 10/1969 | Werner | 96—91 R |
| 3,499,763 | 3/1970 | Cleoak et al. | 96—91 R |
| 3,573,052 | 3/1971 | Gray et al. | 96—91 R |
| 3,615,487 | 10/1971 | Moraw et al. | 96—91 R |
| 2,990,281 | 6/1961 | Printy et al. | 96—91 R |
| 2,593,911 | 4/1952 | Neumann et al. | 96—91 |
| 1,966,755 | 7/1934 | D'Hautrrive | 96—91 X |
| 3,360,371 | 12/1967 | Munder et al. | 96—91 |
| 3,318,699 | 5/1967 | Lind | 96—49 |
| 3,446,620 | 5/1969 | Parker et al. | 96—49 |
| 3,427,162 | 2/1969 | Halperin | 96—91 X |
| 3,427,165 | 2/1969 | Champ et al. | 96—91 X |
| 2,496,240 | 1/1950 | Von Glahn et al. | 96—91 |
| 3,007,795 | 11/1961 | Haydn et al. | 96—91 X |
| 3,312,551 | 4/1967 | Sus | 96—91 X |
| 3,479,183 | 11/1969 | Habib et al. | 96—91 X |

OTHER REFERENCES

Chem. Abstracts, vol. 66, 1967, Abstract #120,816e.

Kosav, J., "Light-Sensitive Systems," J. Wiley & Sons, 1965, pp. 220–232.

CHARLES L. BOWERS, Jr., Primary Examiner

U.S. Cl. X.R.

96—49